Figure 1:
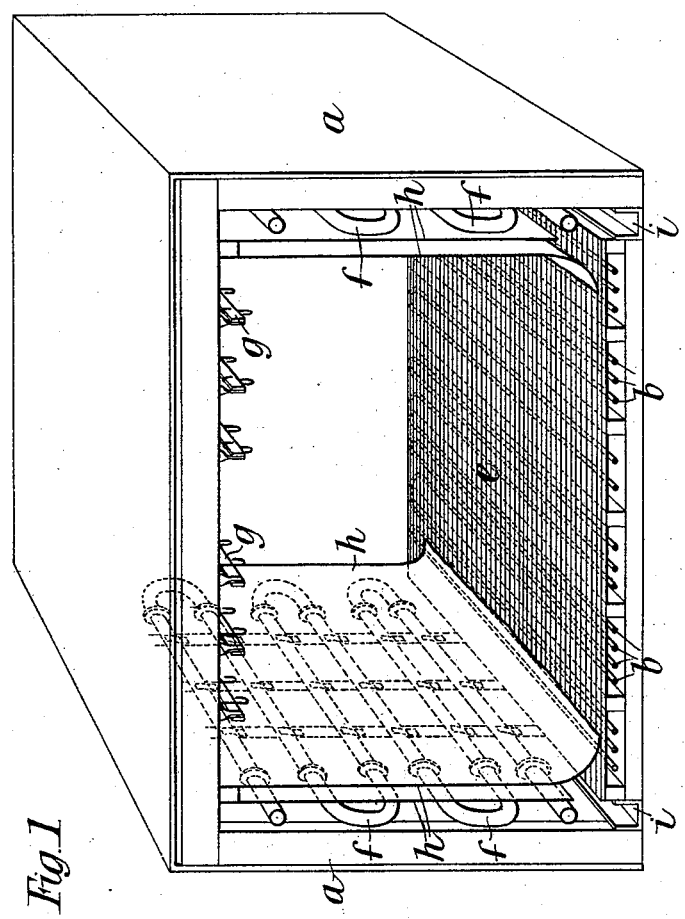

(No Model.)  2 Sheets—Sheet 1.

E. M. NELSON.
PROCESS OF THAWING FROZEN FOOD.

No. 558,298. Patented Apr. 14, 1896.

Witnesses:
G. J. Redfern
John C. Bousfield.

Inventor:
E. M. Nelson (No Model.) 2 Sheets—Sheet 2.

E. M. NELSON.
PROCESS OF THAWING FROZEN FOOD.

No. 558,298. Patented Apr. 14, 1896.

Witnesses. Inventor.

UNITED STATES PATENT OFFICE.

EDWARD MONTAGUE NELSON, OF LONDON, ENGLAND.

PROCESS OF THAWING FROZEN FOOD.

SPECIFICATION forming part of Letters Patent No. 558,298, dated April 14, 1896.

Application filed November 19, 1894. Serial No. 529,305. (No specimens.)

*To all whom it may concern:*

Be it known that I, EDWARD MONTAGUE NELSON, a subject of the Queen of Great Britain, residing at London, England, have invented new and useful Improvements in Thawing Frozen Food, of which the following is a specification.

The object to be attained by this invention is the thawing of frozen food substances, and especially of frozen meat, in a better manner than hitherto and so that in the process of thawing the surface, in the case of meat, shall not become discolored by the deposition upon it of moisture from the atmosphere in which it is being thawed, and, further, so that the amount of loss of weight due to that which is known as "bleeding away" from the meat during and after thawing may be as little as possible. I attain this object by providing that the air which comes in contact with the surface of the meat shall at all times during the thawing contain so little moisture, no matter what its temperature may be, that it will not deposit a dampness on the meat-surface. As the thawing goes on and the surface of the meat rises in temperature I provide that the humidity of the air, also gradually increased in temperature, shall be so regulated that while, on the one hand, it shall not deposit its moisture upon the surface of the meat, on the other hand it shall not be so dry as to abstract largely moisture from that surface, thereby diminishing the salable weight.

With the view of saving first cost and also of diminishing the expenses attendant upon working I cause air to circulate in the room or chamber in which the thawing is effected by simple means, which may be called "natural" means, by raising or lowering its temperature either at the top or the bottom of the room, as may be required.

I find it convenient to proceed as follows: During the process of thawing any given quantity of meat I do not change the air in the room either by the removal of any of it or by the addition of fresh air from outside; but I keep the thawing-room practically hermetically closed. Before the meat is put into the room or chamber I reduce the temperature of the air therein to a point considerably below that of the meat to be thawed, preferably by the employment of pipes containing ammonia capable of being expanded in those pipes, or containing cold brine or glycerin or any other suitable refrigerating medium, as is now well understood, whereby the air deposits a large portion of its moisture. The substances to be thawed are then placed in the chamber and the chamber practically hermetically sealed. The air thus more or less dried is then heated—that is to say, its temperature is raised above the temperature of the substances to be thawed—by being passed over hot-water or steam pipes or other dry heated surfaces and comes in contact with the frozen meat, (the surface of which, it will be remembered, although frozen, is at a considerably higher temperature than that to which the air was reduced when it deposited its moisture,) the result of which is that this air, while gradually warming up the meat from the surface inward, will never be able to deposit moisture upon that surface. As the air becomes warmed it naturally takes up moisture, and this moisture will be supplied from the congealed coating of the cooling-pipes as it is needed, thus regulating the hygroscopic condition of the air, so that it will not abstract moisture to any extent from the meat or other food which is being thawed. The necessary circulation will be provided on account of the lightness of the heated air.

From the foregoing description it will be obvious that my invention does not require the employment of any mechanically-worked apparatus for circulating the air.

Apparatus suitable for carrying my invention into practice is shown in the accompanying drawings, in which—

Figure 2:
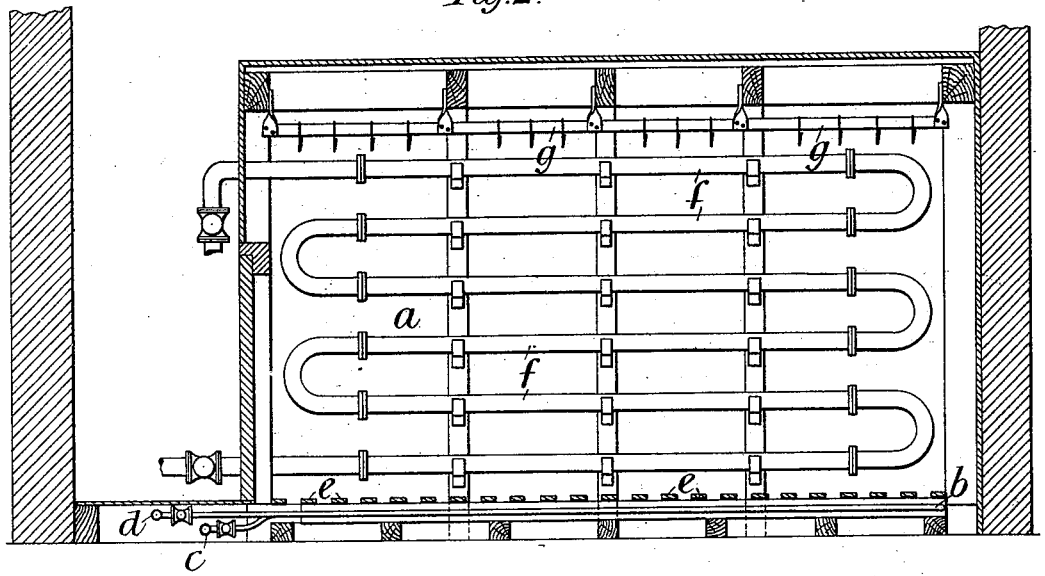
Figure 3:
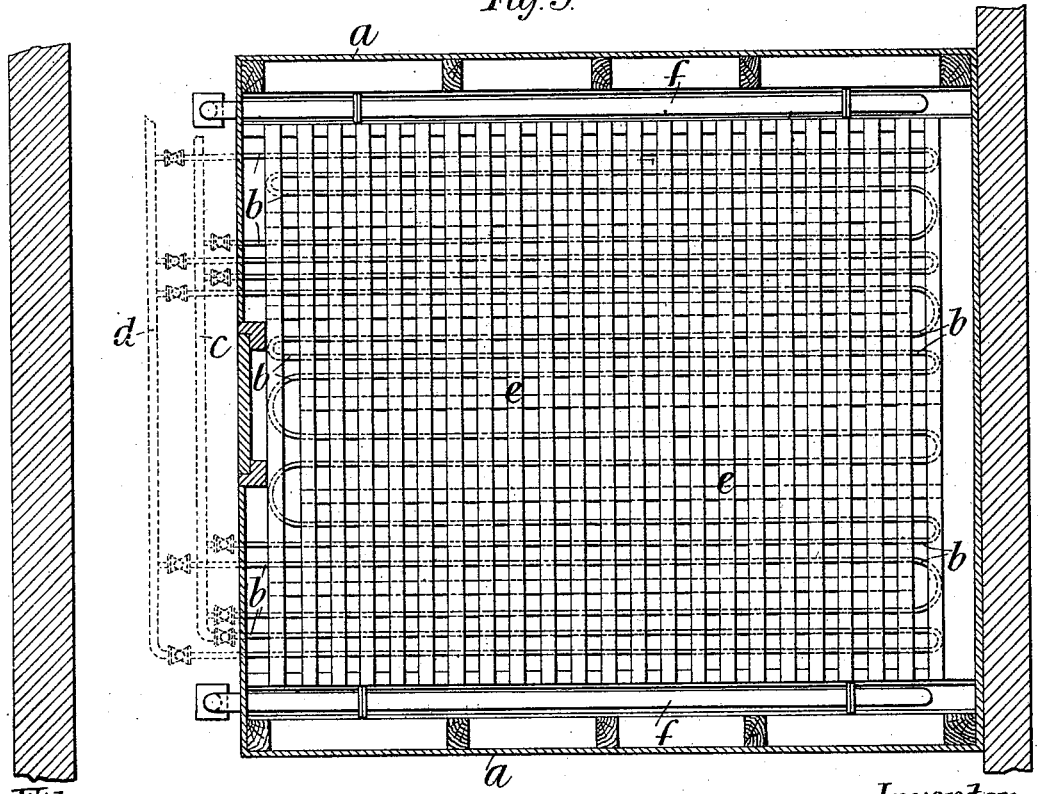

Figure 1 is a perspective view of a chamber having heating and cooling pipes therein, the wall provided with the door being omitted to show the interior. Fig. 2 is a longitudinal section of the same, and Fig. 3 is a sectional plan.

*a a* are the walls of the chamber, which are preferably made double or jacketed in order to prevent the air within the chamber from being affected by the outside temperature.

*b b* are heating-coils, each of which is connected at one end to a steam or hot-water pipe *c* or the like, and at the other end to a pipe *d*, through which the heating medium is discharged after passing through the coils, each of the said coils being provided with a cock or cocks for permitting the supply of steam to be shut off, whereby the temperature within the chamber may be regulated as required, according to the number of coils in use. As shown in the drawings, these coils are arranged beneath the floor $e$ of the chamber, which floor is composed of bars or slats having spaces between them, so as to allow of the circulation of the air in contact with the heating-pipes.

$f\,f$ are coils arranged at the sides of the chamber, through which a freezing mixture is caused to circulate for the purpose of condensing upon their surfaces any moisture contained by the air in the said chamber, and $g\,g$ are bars carrying hooks upon which the food to be thawed can be suspended.

It will be understood that the dryness of the air will depend upon the temperature of the cooling-surface, the cooler the surface the dryer being the air, and vice versa.

$h\,h$ are screens, each of which is advantageously composed of two sheets or pieces of flexible material, such as canvas, suspended from the roof of the chamber, the said screens serving to prevent the extreme coolness of the pipes $f\,f$ from retarding the thawing of the food in proximity to the said pipes and also to cause the currents of air to pass in a regular direction.

$i\,i$ are troughs which extend to the outside of the apparatus and which serve for collecting and discharging the water of condensation which may drop from the freezing-pipes $f\,f$.

It will be understood that in using the apparatus the temperature within the chamber will be raised sufficiently by means of the heating-pipes to gradually thaw the food, and that the warm dry air rising between the slats in the floor, after having taken up some of the moisture given off by the meat during the thawing process, passes around the ends of the screens $h\,h$ into contact with the pipes $f\,f$, upon which the moisture contained by the air is condensed, the air thence passing down under the screens into contact with the heating-pipes, whereby it is more or less warmed so that it again is caused to rise.

Having now particularly described and ascertained the nature of my said invention and in what manner the same is to be performed, I declare that what I claim is—

The process of thawing frozen meats which consists in drying the atmosphere of a closed chamber by causing the moisture to deposit on cold surfaces, then placing the meat to be thawed in the chamber and again closing it, and then raising the temperature of the chamber, whereby no moisture is deposited on the meat on its introduction to the chamber and whereby the exterior layers of the meat are not dried, substantially as described.

EDWARD MONTAGUE NELSON.

Witnesses:
G. F. REDFERN,
JOHN E. BOUSFIELD.